(12) United States Patent
Green

(10) Patent No.: US 8,015,858 B2
(45) Date of Patent: Sep. 13, 2011

(54) ELECTRIC RADIATOR CAP PRESSURE TESTER

(75) Inventor: Michael Philip Green, Pleasant Hill, CA (US)

(73) Assignee: Vehicle Enhancement Labs, Bellflower, CA (US)

( * ) Notice: Subject to any disclaimer, the term of this patent is extended or adjusted under 35 U.S.C. 154(b) by 377 days.

(21) Appl. No.: 11/803,165

(22) Filed: May 14, 2007

(65) Prior Publication Data

US 2008/0282774 A1   Nov. 20, 2008

(51) Int. Cl.
*G01M 3/04* (2006.01)
*G01M 3/00* (2006.01)
(52) U.S. Cl. ............... 73/45.8; 73/49.7; 73/49.8
(58) Field of Classification Search ............ 73/45.8, 73/49.7, 45.5, 40
See application file for complete search history.

(56) References Cited

U.S. PATENT DOCUMENTS

| 5,323,640 | A  | * | 6/1994  | Porcaro et al. ............. 73/40 |
| 5,542,287 | A  | * | 8/1996  | Powers ............... 73/40.5 R |
| 5,557,966 | A  | * | 9/1996  | Corry ..................... 73/49.7 |
| 5,996,402 | A  | * | 12/1999 | Harris ..................... 73/49.7 |
| 6,230,549 | B1 | * | 5/2001  | Harris ..................... 73/49.7 |
| 6,826,957 | B2 | * | 12/2004 | Martone et al. ........ 73/40.5 R |

OTHER PUBLICATIONS

"Re-chargeable battery" (2004). In Dictionary of Computing.*

* cited by examiner

*Primary Examiner* — Lisa M Caputo
*Assistant Examiner* — Punam Roy
(74) *Attorney, Agent, or Firm* — Novak Druce + Quigg LLP

(57) ABSTRACT

The present invention a portable universal electric radiator cap pressure tester, having a multiple of common radiator cap filler necks fixed on a dash board. The fixed filler necks simulate the filler neck openings on a vehicle's radiator or overflow reservoir. This allows the user the ability to quickly install a common radiator cap on the face of the tool and pressurize the radiator cap to its maximum recommended pressure. This gives the user the knowledge if a used radiator cap will hold its recommend pressure and provide a water tight seal during operation on a vehicle when the engine cooling system is under operating pressure.

9 Claims, 4 Drawing Sheets

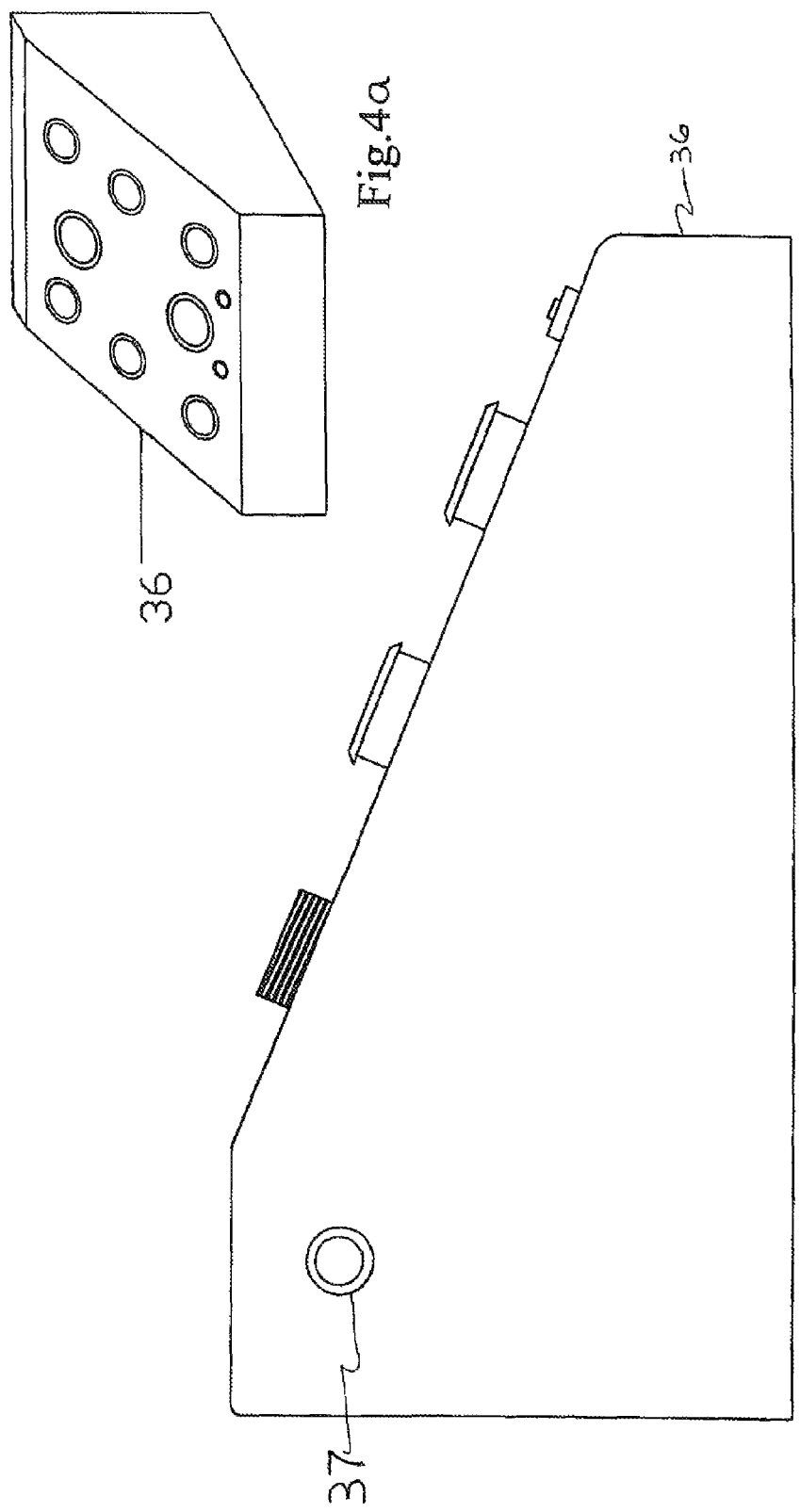

ELECTRIC RADIATOR CAP PRESSURE TESTER

BACKGROUND OF THE INVENTION

Radiator caps are used to perform a critical function in the cooling system operation of a motor vehicle. They are used to seal a filler opening needed for filling or topping off a cooling system liquid. The cooling liquid s used inside a vehicle's heat exchange system, (radiator) and assist in keeping a vehicle's engine temperature stabile and operating at a safe and constant temperature. As this liquid is heated by vehicle's engine, pressure from liquid expansion occurs. Most radiator caps are designed to not only provide a primary and secondary water tight seal but also acts a pressure relief valve. Radiator cap construction generally incorporates a main spring having a rated collapse pressure allowing it to release pressure from the secondary seal to the atmosphere or to an over flow system. Improper radiator cap operating pressures, either too high or too low, with in the system can cause internal damage to the vehicle's engine, radiator or cause overheating problems due to cooling liquid loss.

It is recommended by not only vehicle manufacturers but the radiator cap and radiator manufactures to have radiator caps tested at certain intervals to check the integrity of its pressure relief and sealing capabilities. Radiator cap testing requires a technician to have testing equipment which generally consists of a mechanical hand pump and a series of adapters that simulate radiator filler necks. The technician installs the radiator cap and connects the hand pump to the correct filler neck adapter. The technician then hand pumps air pressure to the sealed adapter while having to watch a pressure gauge to test sealing integrity and how many pounds pressure the radiator cap will hold before it relieves pressure. This process is awkward and time consuming for the technician to perform.

BRIEF SUMMARY OF THE INVENTION

The present invention, a portable, universal electric radiator cap pressure tester, incorporates 6 or more of the most common radiator filler neck adapters, a power switch, a main selector switch and an air pressure gauge all fixed in place to a main dash board. The power switch is used to power an electric air compressor which is used to manufacture and transfer air pressure to a main selector switch. The main selector switch channels air pressure to the prescribed radiator cap filler neck adapter needed for testing. The air pressure gauge allows the user to monitor the recommend air pressure for the individual radiator cap being tested. Once the proper air pressure is achieved, the technician can observe if any air leakage is present within the radiator cap assembly by monitoring the air gauge. An air pressure gauge which does not hold a constant pressure indicates the radiator cap has failed and should be replaced. As a safety factor, an internal pressure relief valve is incorporated into the system to prevent excessive air pressure manufactured by the unit's air compressor.

Vehicle overheating problems can go beyond faulty radiator caps. Engines and radiators sometime need to be pressurized in order to find hidden leaks, problems or damage. A secondary adapter port incorporating an adjustable air regulator can be used for other air pressure requirements for fluid leak diagnosis. The most common practice for technicians to locate these types of problems is to use a hand pump and an appropriate adapter to pressurize the entire engine and radiator system. With the same adapters the present invention can be used to keep a constant regulated flow of air pressure to the engine and radiator, allowing the technician a quicker and easier means of diagnosing for present and potential problems.

The present invention can be used for any type of vehicle diagnosing requiring a constant regulated air flow or air pressure to locate a particular problem or leaks.

BRIEF DESCRIPTION OF THE DRAWINGS

FIG. 4 is a right side right side view of the dash board and mounting box of FIG. 4a.

FIG. 4a is a perspective view of the dash board and mounting box of FIG. 4.

DETAILED DESCRIPTION OF THE DRAWINGS

Figure 1:
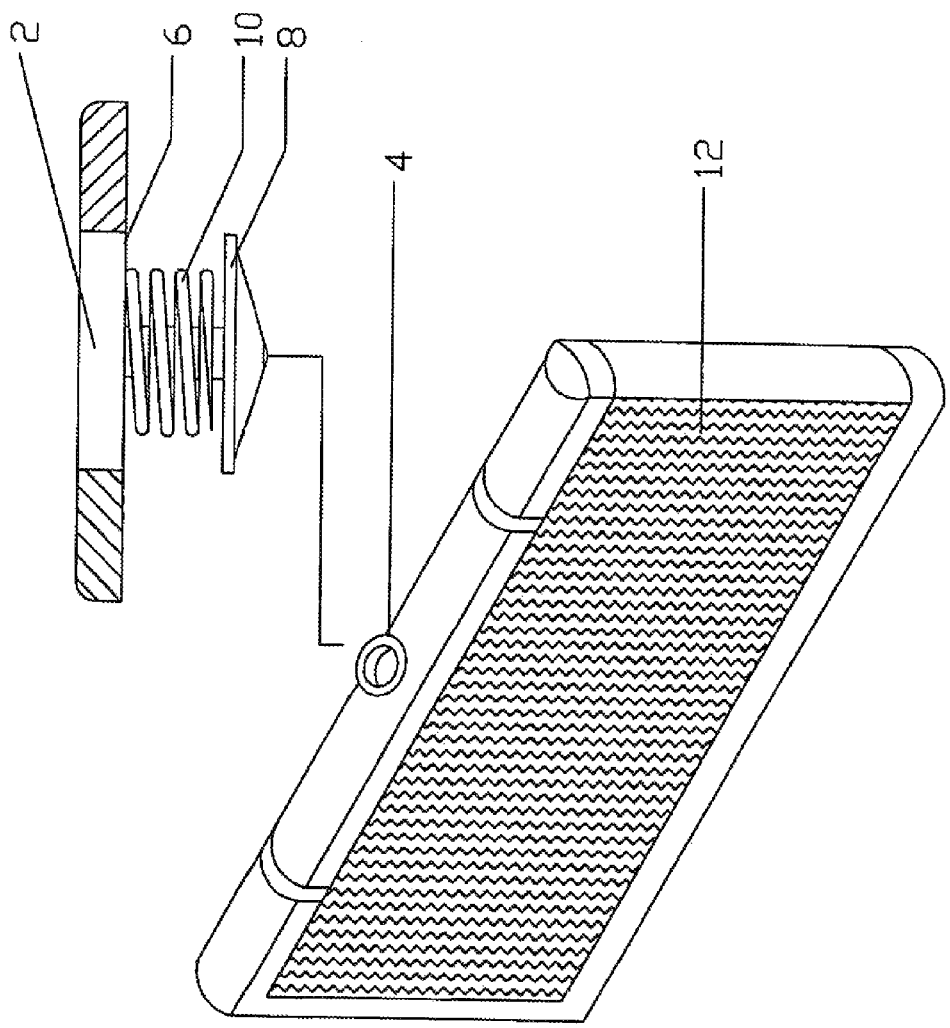
FIG. 1 is a perspective view of a radiator cap and its related art to the radiator.

FIG. 1 illustrates the related art to the present invention. The radiator cap 2 houses a primary seal surface 6, a rated collapsible spring 10 and a secondary seal surface 8. The radiator cap 2 installs onto the radiator filler neck 4 attached to the radiator 12. Lock down onto the radiator filler neck 4 can be either a twist on lock or a thread on lock and performs both an air and water tight seal as to not allow the cooling liquid to escape the vehicle's engine cooling system.

Figure 2:
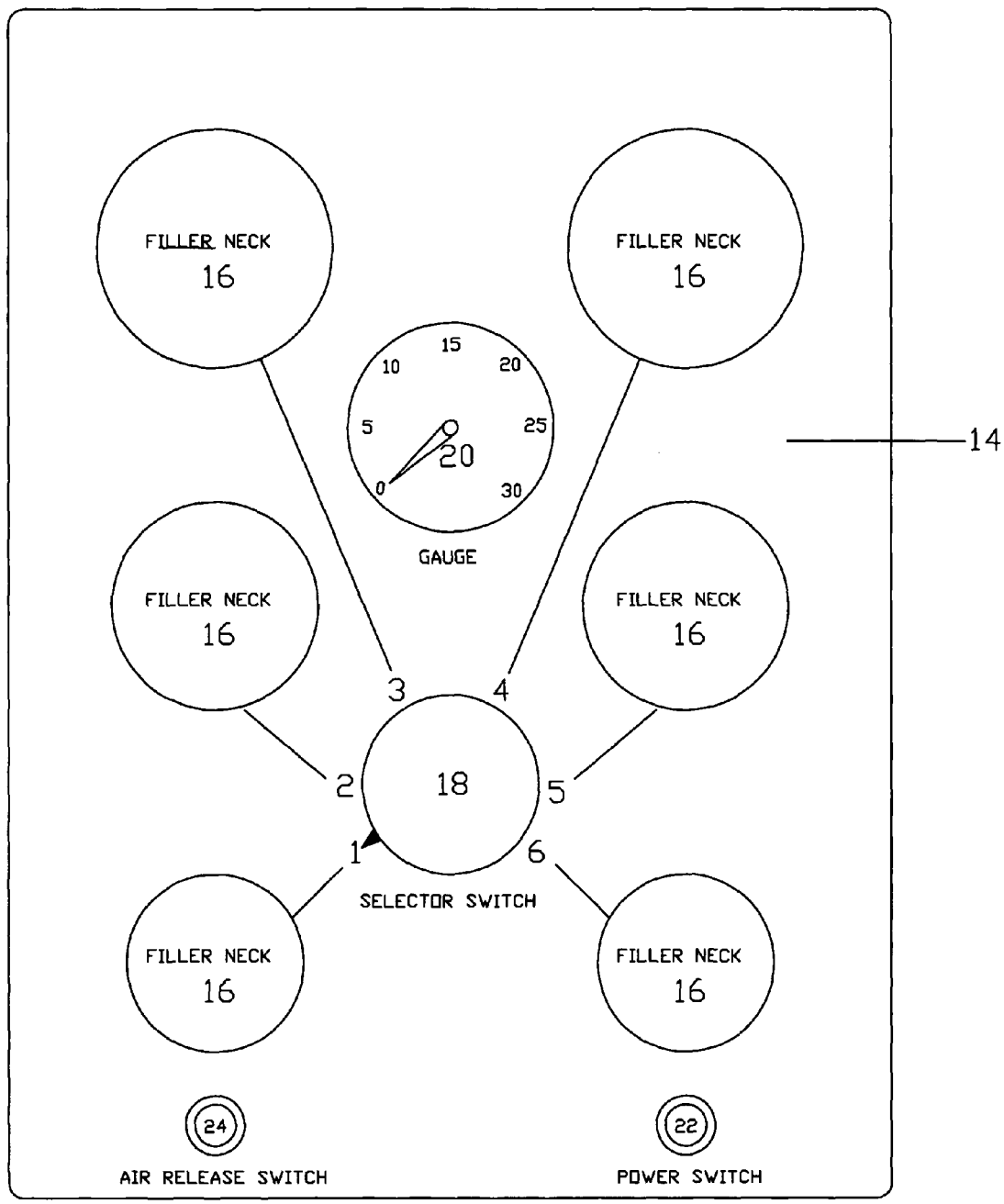
FIG. 2 is a perspective top panel view of the present invention.

FIG. 2 illustrates a design of a dash board panel 14, housing a series of filler neck adapters 16. The filler necks adapters 16 are of different designs which allow accommodation of the many different types and sizes of radiator caps made. A selector switch 18 allows the user to channel air pressure to the selected filler neck adapter 16 needed for testing. The power switch 22 control electrical power to the on board air compressor used to supply air pressure to the present invention. An air pressure gauge 20 measures the amount of air pressure generated from the air compressor. The air pressure gauge 20 is used to indicate to the user that the radiator cap is capable of holding the recommended operating pressures for both pressure relief and sealing. If the recommended radiator cap pressure does not hold stable for a fixed duration of time during testing would indicate that the radiator cap has failed the testing procedure.

An air release switch 24 is incorporated in the system to allow the use to release air pressure out of the system before removing the radiator cape or if too much pressure is generated the air pressure is relieved automatically.

Figure 3:
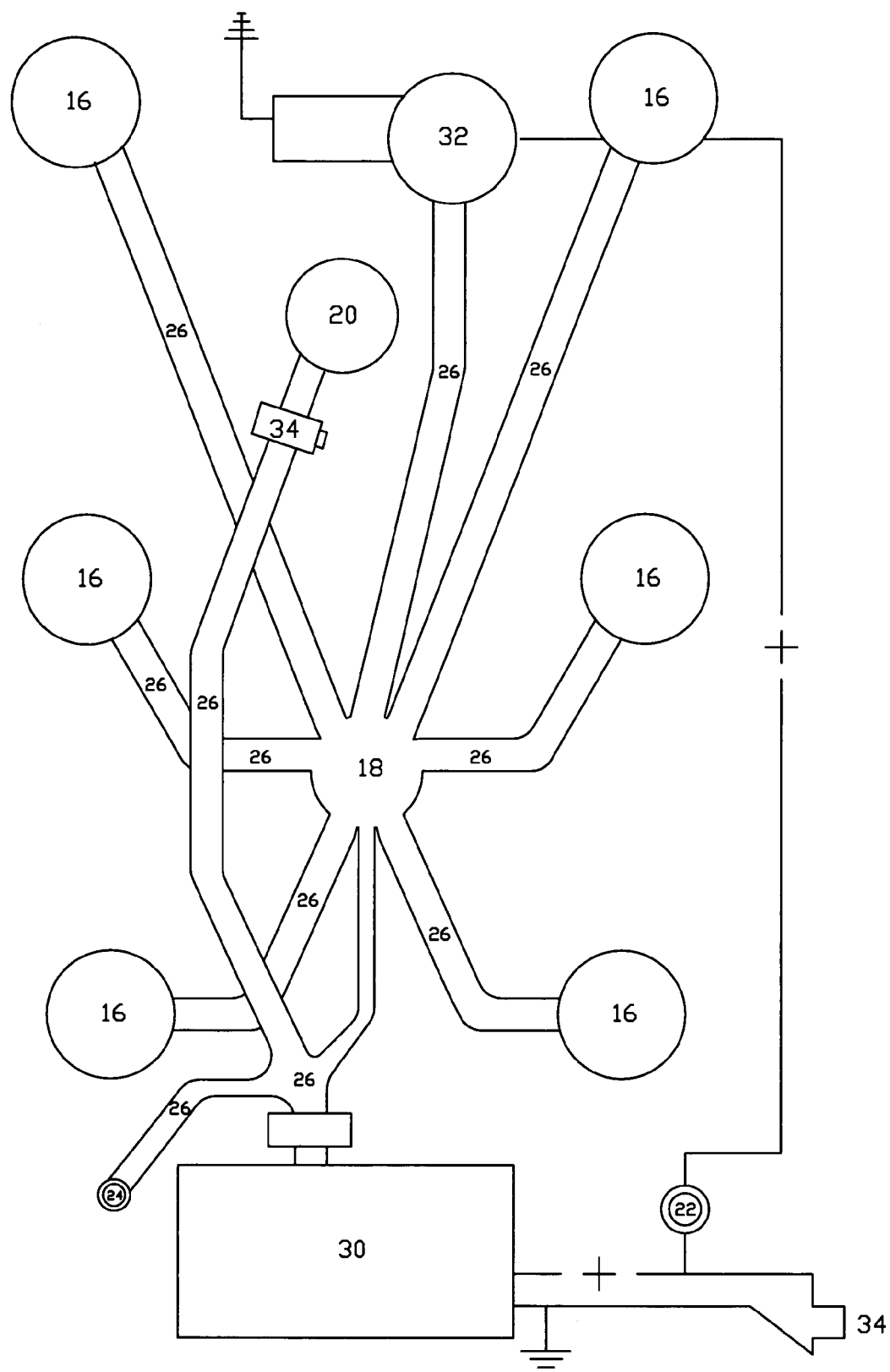
FIG. 3 is a perspective bottom view of the top panel showing of the internal parts.

FIG. 3 illustrates the electrical system containing a battery 30 for powering the unit, the air compressor 32 which manufactures air pressure. The power switch 22 completes the electrical circuit and supplies electrical current from the battery 30 to the air compressor 32. A re-charging port 34 is incorporated into the system to replenish electrical energy used by the battery 30. Rubber hoses or metal tubes 26 channels air pressure supplied by the air compressor 32 to the selector switch 18 which in turns channels the air pressure to the individual selected filler neck adapter 16 and to the air pressure gauge 20. A pressure relief valve 34 automatically discharges exceed air pressure.

FIG. 4 illustrates the enclosure box 36, housing the dash board and all internal components.

FIG. 4a illustrates the enclosure box 36 of FIG. 4 in perspective view to illustrate the secondary adapter port 37 incorporating an adjustable air regulator to check for fluid leaks in an automotive cooling system by pressuring the entire engine and radiator system.

While various modifications, changes and alternatives are suggestible to one skilled in the art based on the descriptions set forth above, the invention is to be given the broadest interpretation based on the scope of the appended claims.

What is claimed is:

1. A portable universal system used for the purpose of pressure testing automotive radiator caps, said system comprising a plurality of filler neck adapters which simulate the different types of filler necks used on either radiators or over flow reservoir systems for automotive cooling applications, an automotive radiator cap to be tested on at least one of said filler necks, a source of pressurizable fluid consisting of pressurized air, said source being selectively fluidly connectable to each of said plurality of filler neck adapters, a visually observable pressure gauge to measure the pressure contained by the automotive cap being tested, an adjustable regulated air port to channel air to pressurize a sealed cooling system of an automobile, testing it for any possible internal or exterior leaks and a pressure relief valve to prevent over pressurizing of the system.

2. The system of claim 1, further comprising a dash board housing the plurality of filler neck adapters.

3. The system of claim 1, further comprising a switch, housed within the filler neck adapters and able to channel air from an air compressor to the filler neck adapter once the radiator cap has been installed.

4. The system of claim 1, further comprising a re-chargeable battery to power the system.

5. The system of claim 1, wherein the visually observable pressure gauge is an analog gauge.

6. The system of claim 1, wherein the visually observable pressure gauge has a digital read out.

7. The system of claim 1, further comprising an air compressor.

8. The system of claim 2, wherein the dash board further comprises a power switch to supply power to an air compressor.

9. The system of claim 3, wherein the switch is a flapper valve.

* * * * *